US008903749B2

(12) United States Patent
Dubois et al.

(10) Patent No.: US 8,903,749 B2
(45) Date of Patent: Dec. 2, 2014

(54) METHOD OF IDENTIFYING A PROTOCOL GIVING RISE TO A DATA FLOW

(75) Inventors: Renaud Dubois, Genneviliers Cedex (FR); Mathieu Morel, Paris (FR); Paul Gompel, Boulogne (FR)

(73) Assignee: Thales, Neuilly sur Seine (FR)

( * ) Notice: Subject to any disclaimer, the term of this patent is extended or adjusted under 35 U.S.C. 154(b) by 257 days.

(21) Appl. No.: 13/635,650

(22) PCT Filed: Mar. 17, 2011

(86) PCT No.: PCT/FR2011/050541
§ 371 (c)(1),
(2), (4) Date: Jan. 4, 2013

(87) PCT Pub. No.: WO2011/114060
PCT Pub. Date: Sep. 22, 2011

(65) Prior Publication Data
US 2013/0117205 A1  May 9, 2013

(30) Foreign Application Priority Data
Mar. 17, 2010 (FR) .................................... 10 01062

(51) Int. Cl.
*G06N 5/02* (2006.01)
*G06N 99/00* (2010.01)
*H04L 12/26* (2006.01)
*H04L 12/24* (2006.01)
*H04L 29/06* (2006.01)
*H04L 29/08* (2006.01)

(52) U.S. Cl.
CPC .............. *G06N 99/005* (2013.01); *H04L 67/02* (2013.01); *H04L 43/18* (2013.01); *H04L 41/142* (2013.01); *H04L 63/0236* (2013.01); *H04L 43/026* (2013.01)
USPC ............................................ 706/12; 706/45

(58) Field of Classification Search
None
See application file for complete search history.

(56) References Cited

PUBLICATIONS

Gilbert, An Approach Towards Anomaly Based Detection and Profiling Covert TCP/IP Channels, Master's Thesis, Concordia University, Aug. 2009, pp. 1-100.*
Mahbod Tavallaaee, et al., "Online Classification of Network Flows", 2009 Seventh Annual Communication Networks and Services Research Conference, May 11, 2009, pp. 78-85, IEEE Computer Society, Piscataway, NJ, USA.
Maurizio Dusi, et al, "Using GMM and SVM-Based Techniques for the Classification of SSH-Encrypted Traffic", IEEE International Conference on Communications, 2009, 6 pages, IEEE Communications Society, Piscataway, NJ, USA.
Jun Li, et al., "Composite Lightweight Traffic Classification System for Network Management", International Journal of Network Management, Feb. 22, 2010, pp. 85-105, vol. 20, No. 2, Wiley InterScience online (www.interscience.wiley.com).
International search report for application No. PCT/FR2011/050541 dated Sep. 30, 2011.

* cited by examiner

*Primary Examiner* — Wilbert L Starks
(74) *Attorney, Agent, or Firm* — Patterson & Sheridan, L.L.P.

(57) ABSTRACT

Method of identifying a protocol at the origin of a data flow. The method of identifying a protocol giving rise to a packet flow comprises the following steps: —a capture of the flow of the protocol to be identified, —statistical classification of the flow, comprising an extraction of the classification parameters and a comparison of the classification parameters with statistical models constructed during a learning phase. The statistical classification comprises: —a first phase of global statistical classification; and —a step of synthesis of the results of the first and second classification phases so as to identify the protocol giving rise to the flow.

10 Claims, 3 Drawing Sheets

METHOD OF IDENTIFYING A PROTOCOL GIVING RISE TO A DATA FLOW

The present invention relates to a method for identifying a protocol at the origin of a data flow of the type including the following steps:
- capture of the flow of the protocol to be identified,
- statistical classification of the flow comprising an extraction of the classification parameters and a comparison of the classification parameters with statistical models constructed during a learning phase.

In the field of security of information systems, the control of the incoming and outgoing flows of a defence or corporation network is crucial. Control of these flows is generally carried out at a piece of gateway equipment, located at the boundary between the local network and the outside world i.e. the Internet network. The goal of such a control is to ensure that the flows passing through it are compliant with the security policy of the corporation. This policy may for example consist of exclusively allowing web navigation, while forbidding exchanges of files of the FTP or peer to peer (P2P) type with the outside world, as well as any direct connection to remote SMTP, SSH servers or other servers.

Many tools have been developed for ensuring observance of these security policies. The methods which they use may be classified in three large categories:
- filtering at the network and transport level via protocol analysis (firewall);
- filtering by analyzing the contents of the application data of the flow (proxy servers); and
- elementary behavioral analysis for identifying suspect behaviors (behavioral IDS or IDPS).

The whole of these protections may however be circumvented by a user of the local network, by using a tunnel application with a controlled remote server.

This method consists of encapsulating the application data of a forbidden protocol within the frames of a protocol which is authorized to cross the gateway. The remote controlled server, controlled by the user, extracts the encapsulated frames and passes them on to their real destination.

The most used protocol for establishing this kind of tunnel is the HTTP protocol, since the latter is almost always authorized through gateways. Thus, the GNU httptunnel software package, http//www.nocrew.org/software/httptunnel.html, of Lars Brinkhoff allows encapsulation of the frames of any protocol (SSH or P2P for example) into HTTP requests. The useful data are camouflaged in certain fields of the request, by means of techniques close to those of steganography.

Likewise, the software package, Stunnel universal SSL wrapper, http//www.stunnel.org/, allows encapsulation of most protocols in a SSL/TLS connection on port 443. The resulting flows are therefore identified by filtering tools as legitimate HTTP flows.

If it may be expected that an enhanced proxy server detects an abnormality in the HTTP requests generated by HTTP-Tunnel, the flows generated by Stunnel are, as for them, ciphered, preventing any inspection of the contents of the packets.

An approach for identifying the undesirable flow circulating in such a tunnel is to determine the protocol giving rise to the data flow (i.e., the encapsulated protocol in the case of a tunnel), by using a small number of parameters which are difficult to forge by an attacker. Once this protocol is identified, the security policy of the local network may be applied for deciding whether to filter the flow or not.

In order to detect the presence of illegitimate tunnels, the use of port numbers proves to be unnecessary and extensive inspection of the contents of the packets is often a source of errors, the designers of tunneling software packages being particularly inventive when the aim is to hide data in a legitimate flow, or is even impossible if the flow is ciphered as in the case of HTTP tunnels.

The methods shown below use statistical tools for exploiting the residual information on the flows after ciphering or encapsulation in another protocol. In particular, it is sought to identify a statistical imprint inherent to each protocol from a reduced number of parameters.

In order that a method for classifying statistical flows may be used, two assumptions have to be made:
- each protocol or protocol class (HTTP, SSH, P2P, VoIP, . . . ) induces a characteristic behavior in terms of generated data packets, both for the size of these packets and for the inter-packet times. For example, an SSH flow will in majority consist of <<small>> packets exchanged in both directions (key strokes, and their <<echo>> responses), while a typical HTTP flow will consist in a request of a medium size, followed by the response of the server over several large size packets; and
- the encapsulation of a protocol in a HTTP/HTTPs tunnel or the like does not notably modify its characteristic behavior (or at the very least the behaviors of the different encapsulated protocols remain distinct).

The use of statistical classification methods for identifying the protocol giving rise to a flow is described in the literature where different methods are studied, in particular N. Williams, S. Zander and G. Armitage, A preliminary performance comparison of five machine learning algorithms for practical IP traffic flow classification, ACM SIGICOMM'06, 2006.

The article presents a comparative summary of several classification methods applied for classifying data flows. Williams shows that among many algorithms (Bayes method, Bayes networks, C4.5, Bayes trees, SVM, etc.) the most performing are SVMs and C4.5.

Document WO 2009/021892 A1 describes a method and an installation for classifying traffic on IP networks. The invention which is described therein applies a statistical method based on a decision tree (C4.5 algorithm) for determining the protocol at the origin of a ciphered flow.

All these methods are efficient but produce a large number of false positive results, i.e. a known classification of flows which are forbidden whereas they are authorized.

The object of the invention is to propose a classification method with which the number of false positive results may be reduced.

For this purpose, the subject-matter of the invention is a method for identifying a protocol at the origin of a data flow of the aforementioned type, characterized in that the statistical classification includes:
- a first global statistical classification phase comprising a step for extracting global classification parameters calculated by applying statistical formulas on part of or all the flow, and a step for processing global classification parameters from a statistical model constructed during a learning phase;
- a second sequential classification phase comprising a step for extracting sequential classification parameters representative of the time sequence of packets forming the flow, and a step for processing the sequential classification parameters from a statistical model constructed during a learning phase; and
- a step for summarizing the results of the first and second classification phases for identifying the protocol at the origin of the flow.

According to a particular embodiment, the method includes one or more of the following characteristics:
- the step for processing the global classification parameters from statistical models constructed during a learning phase comprises application of the Random Forest algorithm;
- the global classification parameters include at least one parameter from:
- the number of transmitted packets, in the client>server direction;
- the number of transmitted bytes, in the client>server direction;
- the average size of the IP packets, in the client>server direction;
- the maximum size of the IP packets in the client>server direction;
- the minimum time between arrivals of two IP packets, in the client>server direction;
- the maximum time between arrivals of two IP packets, in the client>server direction;
- the number of transmitted bytes in the server>client direction;
- the maximum size of the IP packets, in the server>client direction;
- the variance of the size of the IP packets, in the server>client direction; and
- the ratio of number of upflowing bytes divided by total number of exchanged bytes;
- the step for processing the sequential classification parameters from statistical models constructed during a learning phase comprises the application of hidden Markov models;
- the learning phase includes a step for constructing a hidden Markov model for each identifiable protocol and the processing step includes the determination of the hidden Markov model, for which the probability that the flow was emitted by the associated protocol is the largest;
- the sequential classification parameters comprise at least one parameter from the size of the packet and the time interval between packets;
- the step for summarizing the results comprises the application of Bayes' formula in order to provide the probability of the existence of a protocol $$p''_i = \frac{\sum_{k=1}^{n} p_k p(i|k) + \sum_{k=1}^{n} p'_k p'(i|k)}{2}$$

wherein
given a flow F and a set of possible protocols $[a_1 \ldots a_n]$, $p_i$ and $p'_i$ respectively represent the probability that F belongs to protocol $a_i$ according to the RandomForest method applied in the phase and according to the hidden Markov model bench method applied in the phase.

$p''_i$ is the merged probability that F belongs to protocol $a_i$;

$p(i|k)$, respectively $p'(i|k)$, is the probability that the flow belongs to protocol $a_i$ while being aware that the first classification phase, the second classification respectively, stage has classified the flow as belonging to protocol $a_k$;

- the method includes, at the end of the summary step, an additional filtering step;
- the filtering step comprises the taking into account of the history of the results following a predetermined heuristic.

The subject-matter of the invention is also an installation for identifying a protocol at the origin of a flow of packets as described above, characterized in that the statistical classification means include:
- first means for global statistical classification comprising means for extracting global classification parameters calculated by applying a statistical formula on part or all the flow, and means for processing the global classification parameters from a statistical model constructed during a learning phase;
- second means for sequential classification comprising means for extracting sequential classification parameters representative of the time sequence of packets forming the flow, and means for processing the sequential classification parameters from a statistical model constructed during a learning phase; and
- means for summarizing the results of the first and second classification means in order to identify the protocol and the origin of the flow.

The invention will be better understood upon reading the description which follows, only given as an example and made with reference to the drawing wherein.

Figure 1:
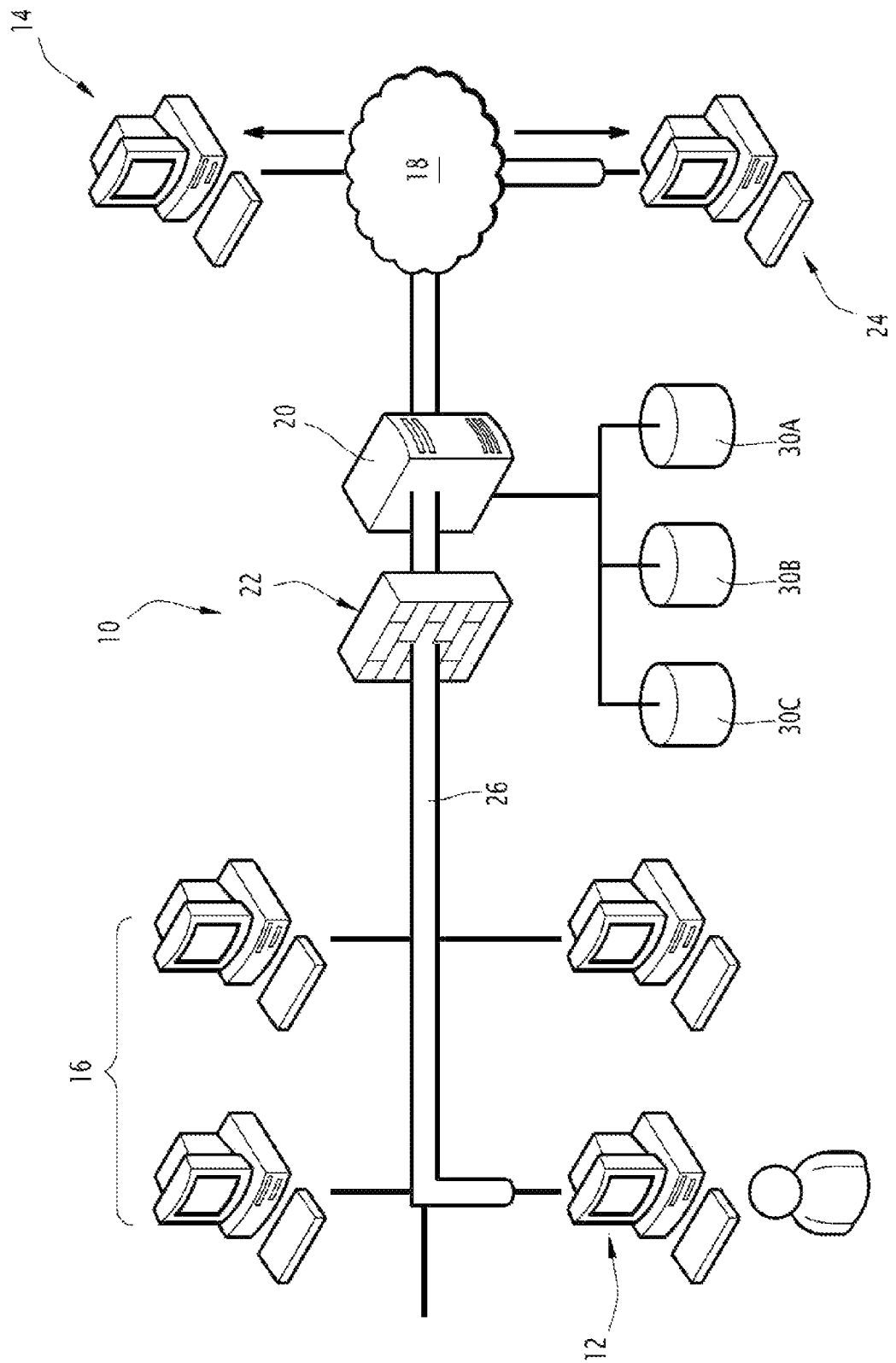
FIG. 1 is a schematic view of an installation in which the method according to the invention is applied.

In FIG. 1 is illustrated a typical diagram of a communication establishing a tunnel between a local station 12 and a remote server 14. The local station 12 is part of a local network 16 for example of a corporation for which the stations are interconnected together and connected to the Internet network 18 through a gateway 20.

This gateway integrates a firewall 22 which, as this is known per se, is able to ensure management and authorization of the incoming and outgoing flows of the local network 16.

As known per se, the gateway 20 includes first filtering means forbidding the transmission of data from the Internet network 18 towards one of the local stations of the network 16 when this transmission uses a certain number of forbidden protocols, such as the SSH or P2P protocol. On the other hand, the gateway 20 allows <<Web>> navigation by authorizing traffic according to the http or https protocol.

For establishing the tunnel, a control server 24 is present on the Internet network 18 outside the local network 16 isolated by the gateway 20 and the firewall 22 of the Internet network 18.

As known per se, the station 12 includes software means for establishing a software tunnel 26 between the station 12 and the control server 24. This software tunnel is able to encapsulate the application data of a forbidden protocol by the gateway 20 within the frames of another protocol authorized by this gateway. For this purpose, the application data required by the station 12 at the remote server 14 are conveyed from the remote server 14 to the control server 24 according to the forbidden protocol, and then the control server 24 ensures encapsulation of the application data within the frames of another protocol authorized by the gateway 24 and finally these data are sent to the station 12 by using this protocol authorized by the server 24.

The authorized protocol is for example the http protocol while the application frames encapsulated in this protocol are transmitted from the server 14 to the server 24 by the SSH or P2P protocol.

Also, the application data sent from the station 12 to the server 14 are transmitted through the control server 24 where the data are de-encapsulated following a reverse process to the one described earlier.

According to the invention, the gateway 20 in addition to the first filtering means, includes means for analyzing the protocol at the origin of a data flow when these data are encapsulated in a protocol authorized by the gateway 20.

Thus, the gateway 20 includes two successive means for filtering the flows, a first filtering means forbidding exchanges of data by using a forbidden protocol between a station of the local network and the Internet, and then a second filtering means forbidding transmissions of data between the Internet network and a station with an authorized protocol in the case when the application data encapsulated within the frames of the authorized protocol stem from a forbidden protocol.

For applying this second filtering process, the gateway 20 includes storage means 30A of a software package applying the successive steps of the analysis method, a data base 30B containing data from a preliminary learning process used by the method and a data base 30C for temporarily storing flows being processed, for example of the MySQL type.

Figure 2:
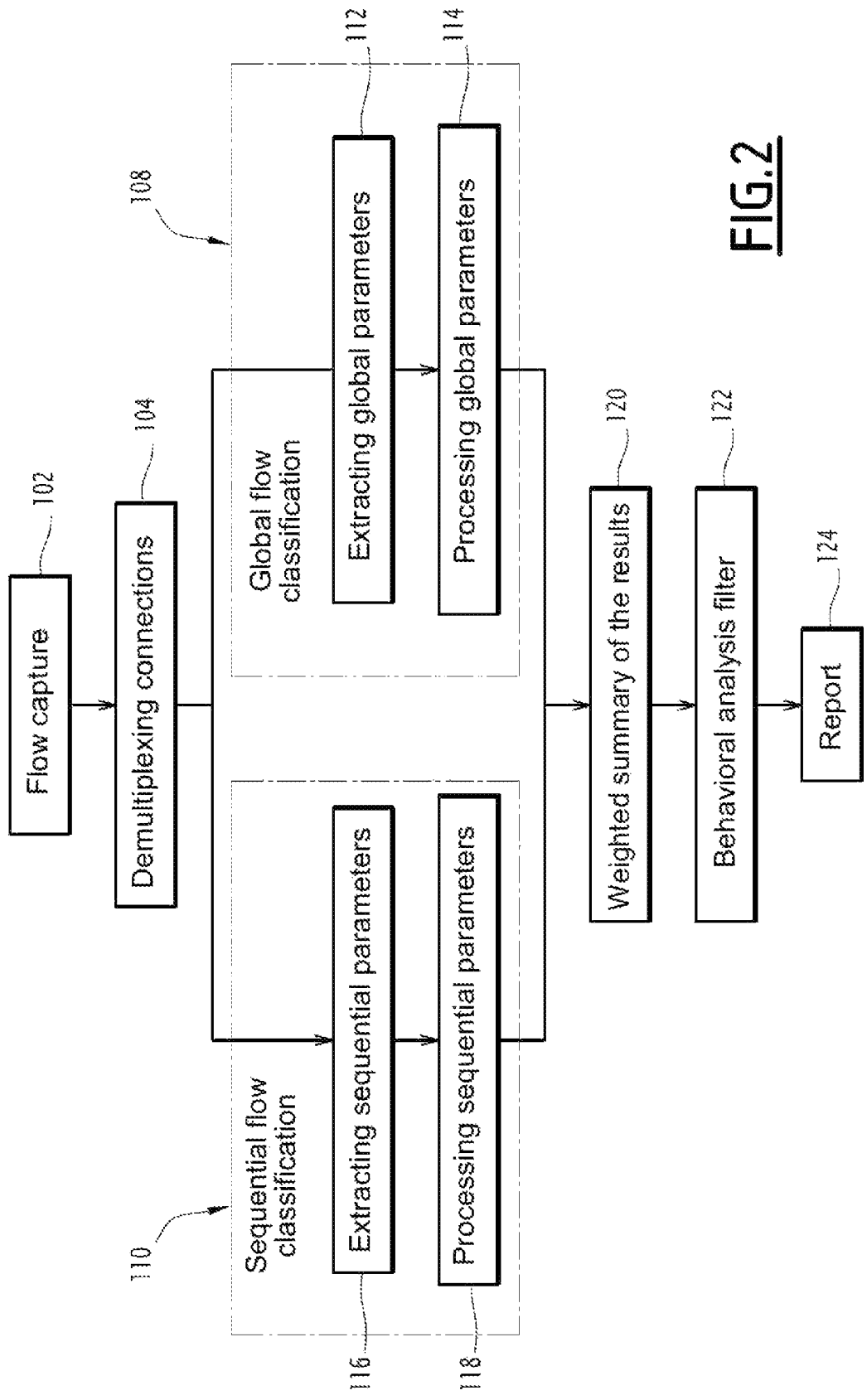
FIG. 2 is a flow chart of the method according to the invention.

FIG. 2 shows the flow chart of the applied method.

The network is constantly listened to in step 102 by means of a programme known per se, such as Tcpdump/Libpcam available at http://ww.tcpdump.org/. This step ensures interception of the different multiplexed flows and their temporary storage in the base 30C.

In step 104, demultiplexing of the different intercepted flows is then carried out by any suitable means and for example by pert scripts.

Two phases 108, 110 for classifying the data flow are applied on each of the demultiplexed flows.

The first classification phase 108 is said to be global in the sense that it comprises a step 112 for extracting global classification parameters calculated by statistical analysis on part or all of the flow, and a step 114 for processing the global classification parameters from statistical models constructed during a preliminary learning phase.

The second statistical classification stage 110 is said to be sequential in the sense that it comprises a step 116 for extracting sequential classification parameters representative of the time sequence of the successive packets forming the flow, and a step 118 for processing the sequential classification parameters from statistical models constructed during a preliminary learning phase.

These parameters extracted in steps 112 and 116 as well as a few elementary pieces of information on each flow (timestamp, IP source and destination addresses, etc) are stored in the data base 30C.

The processing tools, strictly speaking, applying the processing steps 114, 118 are developed in Java, or any other suitable language. The classification results are also stored in the data base 30C.

In step 112, global parameters calculated by statistical analysis on a part or all of the flow (for example the average packet size, etc.) are extracted for each flow. The global parameters are the result of statistical processing operations carried out on the elementary values of these parameters read out on each of the packets forming the portion of the analyzed flow. These are for example averages of standard deviations, of variances, etc. . . . .

These parameters are selected so that they may be evaluated regardless of the relevant TCP flow.

They are inferred from the data contained in the layers 1 to 4 of the OSI model.

Further, in order to make the circumvention of the system harder, the parameters are selected so that their modification is costly for an attacker. For example, TCP flags are not considered. Only the parameters derived from the sizes of the packets and from the times between packets are extracted. For example this is the average size of the client packets towards the server, the variance of the times between packets etc.

In the present application, the term of <<packet>> is meant, as an example, in the sense of <<a TCP packet transporting application data>>. However, the method is not limited to the case of protocols using the TCP/IP stack and the method may be applied regardless of the transmission mode.

Among all the parameters which may be contemplated, only between 5 and 15 parameters, preferably about 10 of them, are retained for ensuring the rapidity of the subsequent classification. These parameters are selected as being the most discriminating towards the protocol at the origin of the flow, i.e. like a subset of parameters with a maximum discriminating power, while keeping a low intra-correlation value.

In other words, these parameters are such that they strongly depend on the protocol of the flow, while being very slightly related to each other. This latter condition is used so as not to overweight certain parameters during the classification.

The latter are advantageously, for phase 108, all or part of the following parameters:
  the number of transmitted packets, in the client>server direction;
  the number of transmitted bytes, in the client>server direction;
  the average size of the IP packets, in the client>server direction;
  the maximum size of the IP packets, in the client>server direction;
  the minimum time between arrivals of two IP packets, in the client>server direction;
  the maximum time between arrivals of two IP packets, in the server>client direction;
  the number of transmitted bytes, in the server>client direction;
  the maximum size of IP packets, in the server>client direction;
  the variance of the size of the IP packets in the server>client direction;
  the ratio of number of upflowing bytes divided by total number of exchanged bytes).

The step for processing global parameters 114 advantageously applies the RandomForest algorithm applied on the ten parameters for classifying each flow.

This algorithm was invented by Leo Breiman and Adele Cutler in 2001, and is described in details in L. Breiman, Random Forests, Machine Learning 45 (1): 5-32, 2001.

The RandomForest algorithm consists in a forest of random decision trees.

Figure 3:
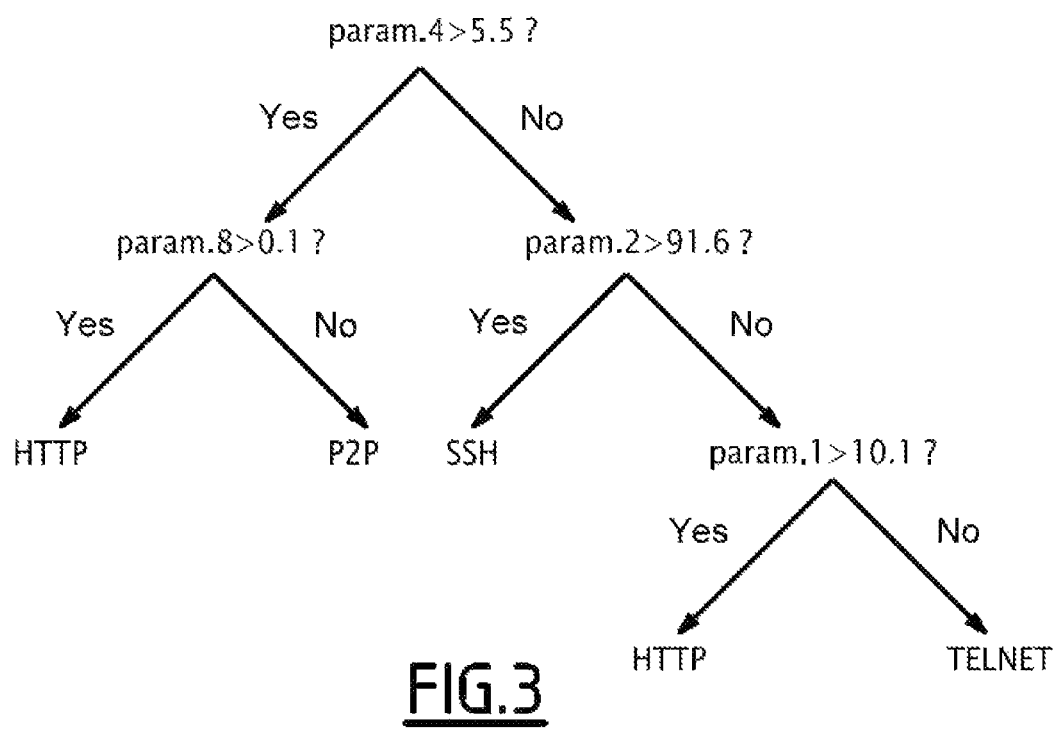
FIG. 3 is a diagram of a tree as applied by a phase of the method.

An example of a decision tree is shown in FIG. 3. Each node of such a tree represents a test on one of the parameters, noted here as parami 4, parami 8, parami 2 and parami 1 relatively to a discriminating value, here 5.5; 0.1; 91.6 and 10.1. Each leaf of the tree represents a protocol here, HTTP, P2P, SSH, HTTP and TELNET.

In order to classify a given flow, the tree is covered from the root by moving down the branches according to the results of the tests. The leaf at which it arrives is the result of the classification.

All the difficulty of the use of decision trees lies in the construction of these trees. The latter is carried out from the learning base, by using an algorithm which recursively determines for each node, the best parameter to be considered and the most relevant discriminating value for this parameter. By doing this, it is sought to minimize the inter-classes entropy resulting from the separation according to this value.

The RandomForest algorithm consists of using not one but several trees, in practice about ten, by introducing a different random value during the learning process for each tree so that all the trees are different. This random value relates to the selection of the parameter to be tested for each of the nodes.

In order to determine the protocol encapsulated in a flow, the flow is classified by each of the trees of the forest. The percentage of trees having lead to each of the possible protocols is interpreted as the probability that the flow belongs to this protocol. In particular the protocol selected by a majority of trees forms the result of the classification and of step 114.

The method for classifying the flows described earlier gives good results. However, it exclusively uses the ten global parameters mentioned earlier for classifying the flows. In particular, any piece of information relating to time sequences of packets is lost since these parameters are averages, variances, minimum or maximum value, calculated over the whole of the flow. Now the <<signature>> of a protocol is also again found in the time course of the exchanges of data and notably in the time sequence of packets.

Thus, a keystroke in the SSH protocol will almost systematically be followed by an <<echo>> packet from the server. On the other hand with the HTTP protocol, a request from the client will be followed by several packets sent by the server, etc.

In order to exploit these pieces of time information lost by the RandomForest algorithm, the sequential flow classification phase 110 applies another statistical analysis method which is based on hidden Markov models (HMM).

Most common protocols are managed by an automaton with a sublying state notably for sequences of the type: establishing the connection, exchanging parameters, <<permanent>> scheme, closing the connection. Further, exchanges of particular packets correspond to each state of this automaton.

The use of hidden Markov models for representing the protocols is therefore appropriate. In practice, a bench of hidden Markov models is used, i.e. a hidden Markov model is constructed in order to represent each protocol. The observable symbols are the pairs [size of the packet, time between packets].

Given that the sizes of the packets and the times between packets may assume a large number of values, a vectorial quantification of these parameters is carried out in order to discretize them. To do this, the packets from flows of a learning base are used and the quantification centroids are determined by using the K-means algorithm. Initialization of the latter is accomplished by randomly drawing points in a sphere around the center of gravity. The client→server and server>client packets are quantified independently (the K-means algorithm is performed twice).

Figure 4:
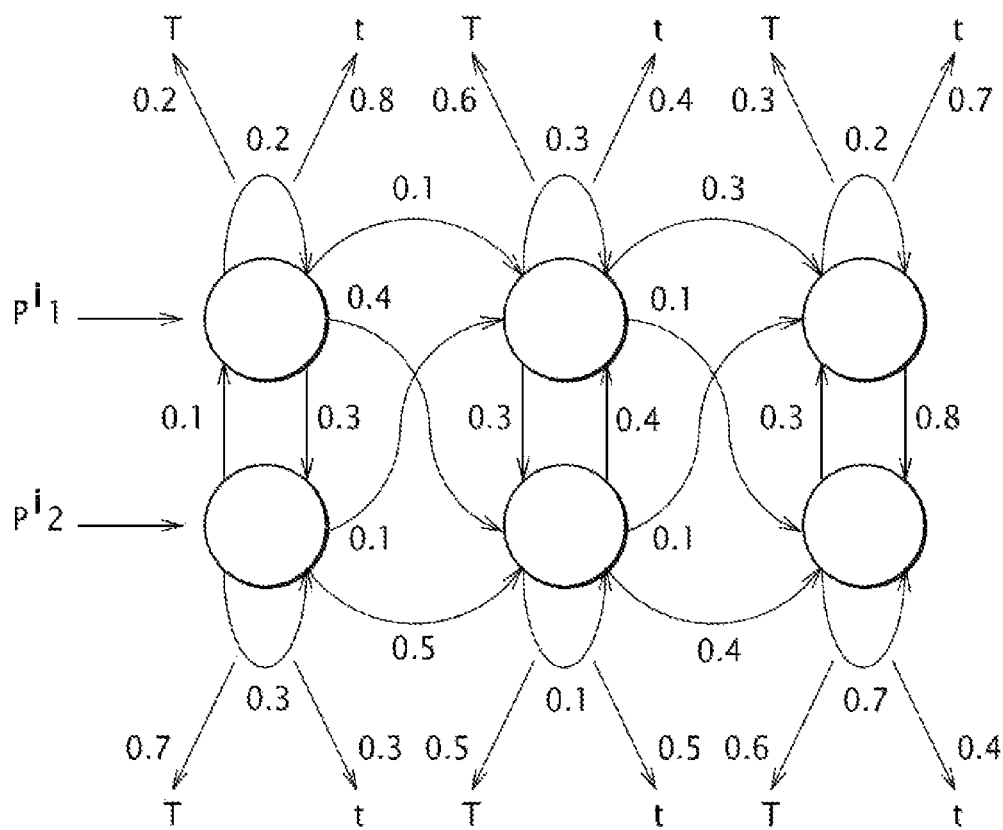
FIG. 4 is a diagram of a graph applied in another phase of the method according to the invention.

An example of a simple hidden Markov model is illustrated in FIG. 4. This model thereby consists of a set of states, including one or several initial states. For each state, a set of transitions towards other states is possible, each transition being weighted by a probability. Over time, displacement is therefore performed in the hidden Markov states.

The relevant hidden Markov models are said to be <<hidden>>, since the succession of states in which they are found is not observable. On the other hand, a series of symbols emitted during successive changes in states is observed. Thus, with a hidden Markov model is associated an alphabet A, and to each state of this hidden Markov model corresponds a distribution of probabilities for emitting symbols from A. In the figure below, the alphabet is {T,t} with T=size of the packet and t=time between packets.

There exist several types of standard problems for hidden Markov models:
  given a hidden Markov model and an observation sequence (i.e. a series of symbols from A), what is the corresponding most probable hidden sequence of states?
  given a hidden Markov model and an observation sequence, what is the probability that this hidden Markov model has produced this sequence of observations?
  given the skeleton of a hidden Markov model and a set of sequences of observations, what are the transition and emission probabilities which maximize the probability that this hidden Markov model has emitted this set of sequences?

The first two problems are solved by means of the Viterbi algorithm, and the third with that of Baum-Welsh. Further information on these algorithms is given in L. R. Rabiner, A tutorial on Hidden Markov Models and selected applications in speech recognition, Proceedings of the IEEE 77 (2): 257-286, 1989.

The <<skeleton>> of the hidden Markov models which are used for each protocol is illustrated in FIG. 4. It comprises two <<lines>> of states. The states of the upper line can only emit packets in the client>server direction, while the states of the lower line can only emit packets in the server>client direction.

By making the assumption that a protocol consists of a succession of <<states>> for which the probabilities of emission of packets [packet size, time between packets] are constant, each <<column>> of the hidden Markov models used represents a protocol state, and only transitions <<towards the right>> are authorized.

Each hidden Markov model further has two initial states $P_1^i$, $P_2^i$ located on the first column.

Given the skeletons of the previous hidden Markov models, all the probabilities of transition and emissions of symbols are calculated by using the learning data base, by applying the Baum-Welsh algorithm. Initialization of this algorithm is accomplished from a hidden Markov model for which the probabilities are uniform.

A hidden Markov model is constructed for each protocol which one wishes to be able to recognize. The probability that a flow belongs to the protocol i is given by the probability that this flow has been produced by the $i^{th}$ hidden Markov model. The latter is calculated by the Viterbi algorithm. In order to classify a flow, a search is therefore conducted for the hidden Markov model giving the largest probability of emission for this flow.

In practice, the hidden Markov models below are used with 6 or 8 states, and a quantification dictionary with 20 to 30 vectors is used.

With each of the two parallel classification phases 108, 110, it is possible to determine the probability that a given flow belongs to each of the possible protocols. In step 120, the probabilities sent back by each of the phases 108 and 100 are combined in order to infer therefrom a final classification result and a confidence level on this result.

Given a flow F and a set of possible protocols $[a_1 \ldots a_n]$, one has two vectors of probabilities $[p_1 \ldots p_n]$ and $[p'_1 \ldots p'_n]$, wherein $p_i$ and $p'_i$ respectively represent the probability that F belongs to the protocol $a_i$ according to the RandomForest method applied in phase 108 and according to the method of the bench of hidden Markov models applied in phase 110.

The results of classification of both methods are summarized in step 120 by the Bayes formula:

$$p''_i = \frac{\sum_{k=1}^{n} p_k p(i|k) + \sum_{k=1}^{n} p'_k p'(i|k)}{2}$$

wherein
- $p''_i$ is the merged probability for F belonging to the protocol $a_i$;
- $p(i|k)$, respectively $p'(i|k)$, is the probability that the flow belongs to the protocol $a_i$ being aware that the RandomForest method, the method of the bench of hidden Markov models respectively, has classified the flow as belonging to the protocol $a_k$. These probabilities are estimated by manipulating the learning data base.

Step 120 generates at the output a probability vector $[p''_1 \ldots p''_n]$. The global classification result is therefore given by $\text{argmax}_i(p''_i)$, wherein max is the maximum argument function. The associated confidence level is $p''_{imax}$.

These values are saved for each flow as well as for the host of the origin of the emission and/or the receiver of this data flow.

In order to further limit the number of false positive results, an artificial intelligence filtering module is applied in step 122. According to a first embodiment, the module comprises heuristics obtained by experimental measurements on the network on which the device is set up.

Alternatively, a certain number of heuristics are applied in step 122 to the history of the classification results in order to raise an alert reporting the use of a forbidden protocol, or not. A heuristic thus for example consists of not raising an alert if the confidence level on the classification is less than a predetermined threshold, or if the relevant host has always had a flawless behavior previously, i.e. this is a first detection of a flow encapsulating an unauthorized protocol from or towards this role.

Application of these heuristics in step 124 generates an analysis report, updated in real time, containing the raised alerts and their criticality level. This report may be set to the Syslog format for reasons of interoperabilities for example.

The invention claimed is:

1. A method for identifying a protocol at the origin of a flow of packets including the following steps:
   - capture of the flow of the protocol to be identified,
   - statistical classification of the flow, comprising an extraction of classification parameters and a comparison of the classification parameters with statistical models constructed during a learning phase,
   - wherein the statistical classification includes:
     - a first global statistical classification phase comprising a step for extracting global classification parameters calculated by applying statistical formulae on part or all of the flow, and a step for processing the global classification parameters from a statistical model constructed during a learning phase;
     - a second sequential classification phase comprising a step for extracting sequential classification parameters representative of the time sequence of packets forming the flow, and a step for processing sequential classification parameters from a statistical model constructed during a learning phase; and
     - a step for summarizing the results of the first and second classification phases for identifying the protocol at the origin of the flow.

2. The method according to claim 1, wherein the step for processing the global classification parameters from statistical models constructed during a learning phase comprises the application of the RandomForest algorithm.

3. The method according to claim 1, wherein the global classification parameters include at least one parameter from:
   - the number of transmitted packets, in the client>server direction;
   - the number of transmitted bytes in the client>server direction;
   - the average size of the IP packets, in the client>server direction;
   - the maximum size of the IP packets, in the client>server direction;
   - the minimum time between arrivals of two IP packets, in the client>server direction;
   - the maximum time between arrivals of two IP packets, in the client>server direction;
   - the number of transmitted bytes, in the server>client direction;
   - the maximum size of the IP packets, in the server>client direction;
   - the variance of the size of the IP packets, in the server>client direction; and
   - the ratio of number of upflowing bytes divided by total number of exchanged bytes.

4. The method according to claim 1, wherein the step for processing the sequential classification parameters from statistical models constructed during a learning phase comprises the application of hidden Markov models.

5. The method according to claim 4, wherein the learning phase includes a step for constructing a hidden Markov model for each identifiable protocol and in that the processing step includes the determination of the hidden Markov model for which the probability that the flow has been emitted by the associated protocol is the largest.

6. The method according to claim 1, wherein the sequential classification parameters comprise at least one parameter from the size of the packet and the time between the packets.

7. The method according to claim 1, wherein the step for summarizing the results comprises the application of Bayes formula for providing the probability of the existence of a protocol $$p''_i = \frac{\sum_{k=1}^{n} p_k p(i|k) + \sum_{k=1}^{n} p'_k p'(i|k)}{2}$$

wherein
- given a flow F and a set of possible protocols $[a_1 \ldots a_n]$, $p_i$ and $p'_i$ respectively represent the probability that F belongs to the protocol $a_i$ according to the RandomForest method applied in phase and according to the method of the bench of hidden Markov models applied in phase,
- $p''_i$ is the merged probability that F belongs to the protocol $a_i$;
- $p(i|k)$, respectively $p'(i|k)$, is the probability that the flow belongs to protocol $a_i$ being aware that the first classification phase, the second classification phase respectively, has classified the flow as belonging to the protocol $a_k$.

8. The method according to claim 1, wherein it includes, at the end of the synthesis step, an additional filtering step.

9. The method according to claim 8, wherein the filtering step comprises the taking into account of the history of the results following a predetermined heuristic.

10. An installation for identifying a protocol of the origin of a flow of packets including:
- means for capturing the flow of the protocol to be identified,
- means for statistical classification of the flow, comprising means for extracting the classification parameters and means for comparing the classification parameters with statistical models constructed during a learning phase,
- wherein the statistical classification means include:
- first global statistical classification means comprising means for extracting global classification parameters calculated by applying statistical formulas on part or all of the flow, and means for processing the global classification parameters from a statistical model constructed during a learning phase;
- second sequential classification means comprising means for extracting sequential classification parameters representative of the time sequence of packets forming the flow, and means for processing the sequential classification parameters from a statistical model constructed during a learning phase; and
- means for summarizing the results of the first and second classification means in order to identify the protocol at the origin of the flow.

\* \* \* \* \*